United States Patent [19]

Barnsley et al.

[11] Patent Number: 5,384,867
[45] Date of Patent: Jan. 24, 1995

[54] FRACTAL TRANSFORM COMPRESSION BOARD

[75] Inventors: Michael F. Barnsley; Alan D. Sloan; John H. Elton, all of Atlanta; Charles S. Moreman, Lawrenceville; Guy A. Primiano, Cumming, all of Ga.

[73] Assignee: Iterated Systems, Inc., Norcross, Ga.

[21] Appl. No.: 781,587

[22] Filed: Oct. 23, 1991

[51] Int. Cl.[6] .......................... G06K 9/00; G06F 15/62
[52] U.S. Cl. .................................... 382/56; 382/30; 382/27; 358/433
[58] Field of Search ...................... 382/56, 27, 30, 41, 382/34, 14, 15; 358/433, 467

[56] References Cited

U.S. PATENT DOCUMENTS

| | | | |
|---|---|---|---|
| 4,694,407 | 9/1987 | Ogden | 364/518 |
| 4,805,225 | 2/1989 | Clark | 382/15 |
| 4,941,193 | 7/1990 | Barnsley et al. | 382/56 |
| 5,065,447 | 11/1991 | Barnsley et al. | 382/56 |
| 5,076,662 | 12/1991 | Shih et al. | 382/30 |
| 5,274,466 | 12/1993 | Ida et al. | 358/426 |

OTHER PUBLICATIONS

Iterated Function Systems and The Global Construction of Fractals, Proc. R. Soc. Lond., A399, 243–275 (1985).
Solution of an Inverse Problem for Fractals and Other Sets, Proc. Natl. Acad. Sci. USA, vol. 83, 1975–1977 (Apr. 1986).
A New Class of Markov Porcesses for Image Encoding, School of Mathematics, Georgia Inst. of Technology (1988).
Fractal Modelling of Biological Structures, Perspectives in Biological Dynamics and Theoretical Medicine, Koslow, Mandell, Shlesinger, eds., Annals of New York Academy of Sciences, vol. 504, 179–194, date unknown.
An Ergodic Theorem for Iterated Maps, Ergodic Theory and Dynamical Systems, 7 (1987).
Construction of Fractal Objects with Iterated Function Systems, SIGGRAPH '85 Proceedings, vol. 19, No. 3, 271–278 (1985).
Fractal Modelling of Real World Images, Lecture Notes for Fractals; Introduction, Basics and Perspectives, SIGGRAPH (1987).
Packing It In—Fractals . . . , Science News, vol. 131, No. 18, pp. 283–285, May 2, 1987.
Fractal Geometry—Understanding Chaos, Georgia Tech Alumni Magazine, p. 16 (Spring 1986).
Fractals—A Geometry of Nature, Georgia Institute of Technology Research Horizons, p. 9 (Spring 1986).
A Better Way to Compress Images, by Barnsley et al., Byte Magazine, Jan. 1988.
Researchers Use Fractal Geometry . . . , by Skip Derra, Research and Development Magazine, Mar. 1988.
"Data Compression: Pnting by Numbrs" The Economist, May 21, 1988.

(List continued on next page.)

Primary Examiner—Leo H. Boudreau
Assistant Examiner—Larry J. Prikockis
Attorney, Agent, or Firm—Finnegan, Henderson, Farabow, Garrett & Dunner

[57] ABSTRACT

Digital image data compression apparatus includes a controller circuit for receiving digital image data and for processing the image data into blocks. The controller circuit supplies processed image data to a plurality of transform circuits and to a feeder circuit. The transform circuits receive data from the controller circuit and the feeder circuit, and provide parallel processing to compare blocks of image data and generate fractal transform values representing the image data in a compressed form.

20 Claims, 13 Drawing Sheets

OTHER PUBLICATIONS

Just the Bare Facts, Please, by William Baldwin, Forbes Magazine, Dec. 12, 1988.

Harnessing Chaos For Images Systhesis, by Barnsley et al., Computer Graphics, vol. 22, No. 4, Aug. 1988.

Chaotic Compression, by Barnsley et al., Computer Graphics World, Nov. 1987.

Making A New Science, pp. 215, 239, by James Gleick, date unknown.

Hidden Variable Fractal Interpolation Functions, by Barnsley et al., School of Mathematics, Georgia Institute of Technology, Atlanta, Ga. 30332, date unknown.

A Fractal Based Approach To Image Compression, Proc. ICASSP 86, vol. 1, pp. 529–532, Tokyo, Apr. 1986.

"Ideas Galore, But Where Are The Goods?", Business Week, Feb. 10, 1992, pp. 122–123.

Jacquin, A. E. "A Novel Fractal Block-Coding Technique for Digital Images" ICASSP 90. 1990 Int. Conference on Acoustic, Speech & Signal Processing Cat. No. 90CH2847-2, Apr. 1990.

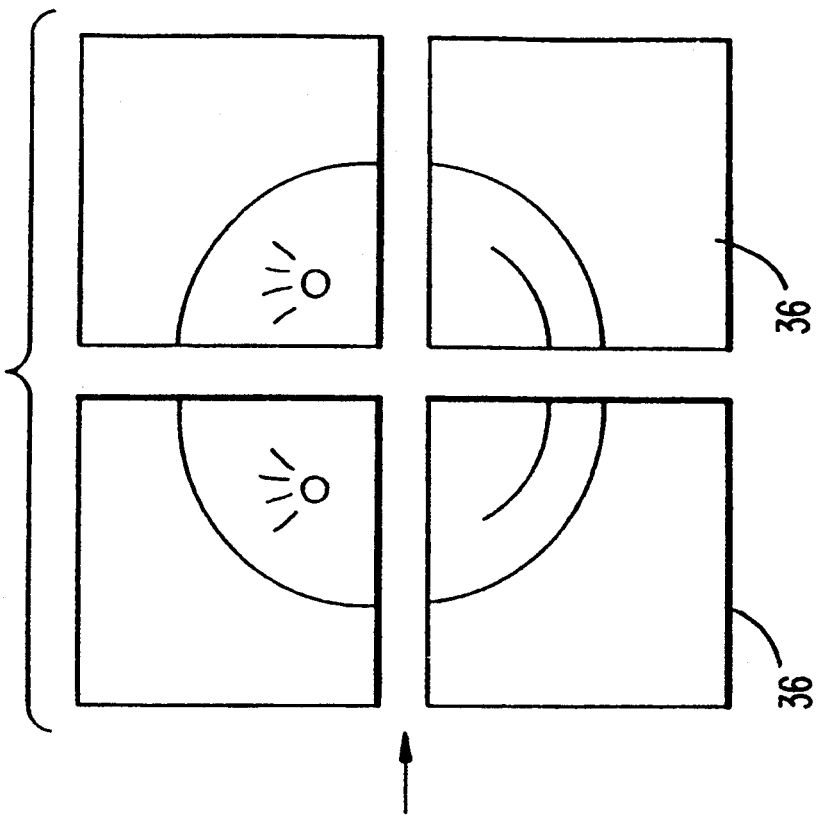
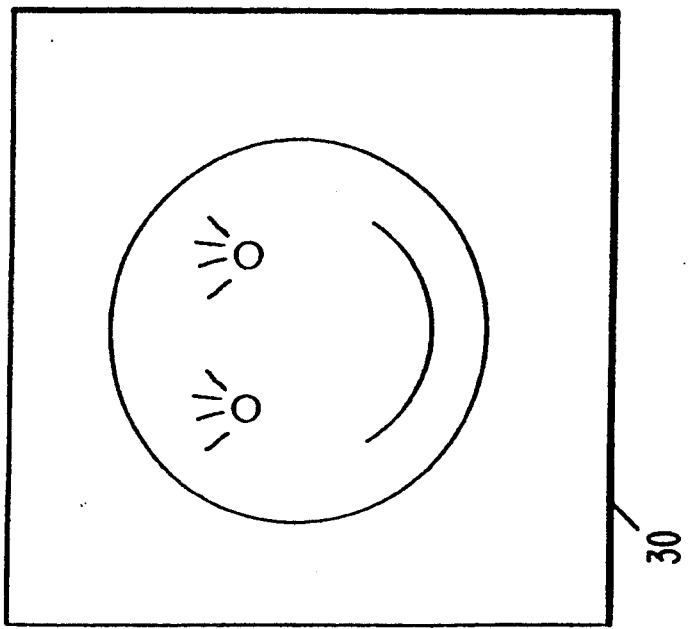

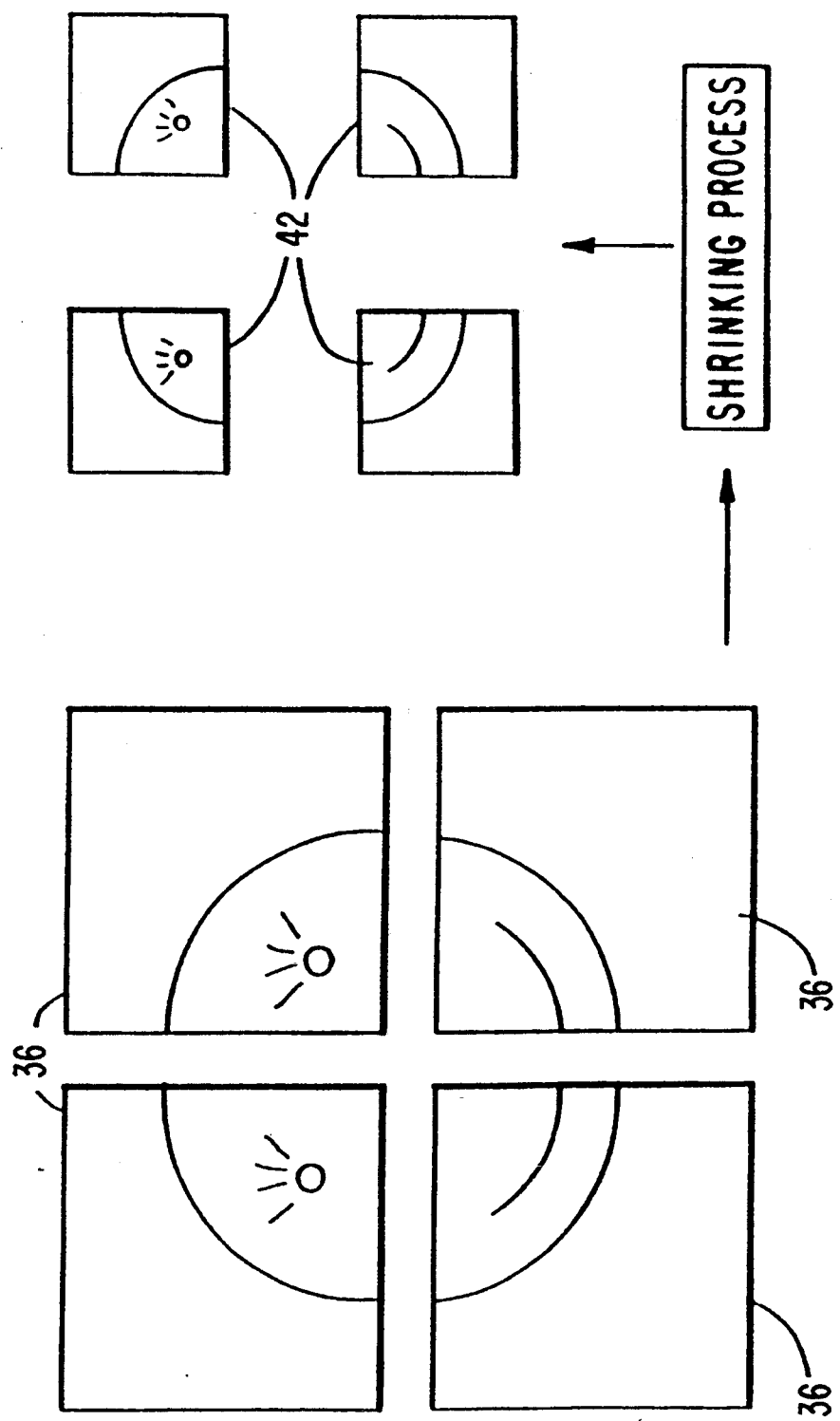

FIG. 8

FFFFFFFF ─────────────────────────────

EPROM RESIDENT ROUTINES

FFFF8000 ─────────────────────────────

70000007 ─────────────────────────────

COMMUNICATIONS INTERFACE WITH PC

70000000 ─────────────────────────────

60003FFF ─────────────────────────────

DATA FEEDER RAM AND REGISTER AREA
RANGE PIXEL RAM, RANGE AVERAGE RAM
PATTERN RAM
CONTROL REGISTERS

30000000 ─────────────────────────────

2007FFFF ─────────────────────────────

FTC RAM AND REGISTER AREA
DOMAIN BLOCK STORAGE,
DOMAIN AVERAGE STORAGE
CONTROL REGISTERS FOR
8 FTC CHIPS

20000000 ─────────────────────────────

1003FFFF ─────────────────────────────

USER (APPLICATION SOFTWARE) AREA
IMAGE BUFFER, DATA LOAD BUFFERS
RESULT BUFFERS, TASK-SPECIFIC SOFTWARE

10002000 ─────────────────────────────

RESERVED FOR FUTURE USE

10001E00 ─────────────────────────────

1960 CACHE, SYSTEM CONTROL TABLES
INTERRUPT VECTORS, STACK

00000000 ─────────────────────────────

FRACTAL TRANSFORM COMPRESSION BOARD

BACKGROUND OF THE INVENTION

The present invention relates generally to image processing and, more particularly, to methods and apparatus which employ contractive transformations for representing images and compressing image.

Processing of data representing pictures, or images, is becoming increasingly important. In particular, attention is being directed to the problem of compressing image data to permit such data to be stored and transmitted faster and more efficiently.

Some prior art data compression methods employ hook-up tables as part of the compression procedure. Such methods can be useful in certain applications where the class of images being compressed is small. However, use of look-up tables as the primary compression mechanism limits the ability to provide a compression image which is adaptive to a large number of diverse images.

Methods and apparatus which avoid such problems of the prior art by the use of a fractal transform are described in copending U.S. patent application Ser. No. 07/375,840 entitled METHOD AND APPARATUS FOR PROCESSING DIGITAL DATA, filed Jul. 5, 1989, now U.S. Pat. No. 5,065,447 issued Nov. 12, 1991 by Michael F. Barnsley and Alan D. Sloan, and U.S. patent application Ser. No. 07/781,586 entitled IMPROVED METHOD AND APPARATUS FOR PROCESSING DIGITAL DATA filed on even date herewith by Michael F. Barnsley and Alan D. Sloan. These applications are hereby expressly incorporated by reference.

It is desirable to provide improved methods and apparatus for optimizing the techniques described in the aforementioned copending applications.

SUMMARY OF THE INVENTION

In accordance with the purpose of the invention, there is provided apparatus for generating transforms representing compressed digital image data. The apparatus comprises control means for receiving digital image data to be compressed, for subdividing the digital image data into a set of domain blocks and a set of range blocks each comprising pixel data, for computing sets of multiple orientation blocks for the domain blocks each comprising pixel data, for computing average values for the domain and range blocks, and for receiving transform values corresponding to the domain blocks. The apparatus further comprises feeder means coupled to the control means for receiving the range block pixel data and the range block average values, and for calculating intermediate range block values from the range block pixel data and the range block average values. Finally, the apparatus comprises a plurality of transform means coupled to the control means and the feeder means, for receiving the sets of orientation blocks and the intermediate range block values, for determining for each domain block a selected orientation block and a selected range block which have the greatest similarity, for generating a transform value for each domain block which is representative of the selected orientation block and range block, and for supplying the transform values to the control means.

In another aspect, the invention comprises a method for compressing digital image data, comprising the steps of receiving digital image data to be compressed; processing the digital image data into domain block data and range block data, the domain block data comprising a set of domain blocks and the range block data comprising a set of range blocks, the set of domain blocks comprising a set of non-overlapping uniquely addressable blocks of pixel data which collectively contain all of the received image data, and the set of range blocks comprising a set of uniquely addressable blocks of pixel data of the received image data which have been subjected to a contractive process; calculating intermediate range block values from the range block data; and receiving domain block data for a plurality of domain blocks and the intermediate range block values into a plurality of transform circuits. The method comprises the additional steps of simultaneously determining, for each domain block corresponding to the received domain block data, a selected range block which has the greatest similarity; generating a transform value, for each domain block corresponding to the received domain block data, which is representative of the selected range block; and supplying the transform values as a compressed representation of the received digital image data.

The accompanying drawings, which are incorporated in and constitute a part of this specification, illustrate one embodiment of the invention, and, together with the description, serve to explain the principles of the present invention.

BRIEF DESCRIPTION OF THE DRAWINGS

FIG. 2 (comprising FIGS. 2a-2b) shows the process of dividing the image of FIG. 1 into range blocks;

FIG. 3 shows the process of producing shrunken range blocks from the range blocks of FIG. 2;

FIG. 8 shows organization of address space of the controller circuit shown in FIG. 5;

DESCRIPTION OF THE PREFERRED EMBODIMENT

Reference will now be made in detail to a preferred embodiment of the invention, an example of which is illustrated in the accompanying drawings. However, before providing a detailed description of the structure of the preferred embodiment, a short background discussion will be provided of the process of data compression using a fractal transform. A detailed discussion of this process is provided in the aforementioned U.S. patent applications Ser. Nos. 07/375,840 now U.S. Pat. No. 5,065,447 and 07/781,586.

Figure 1A:
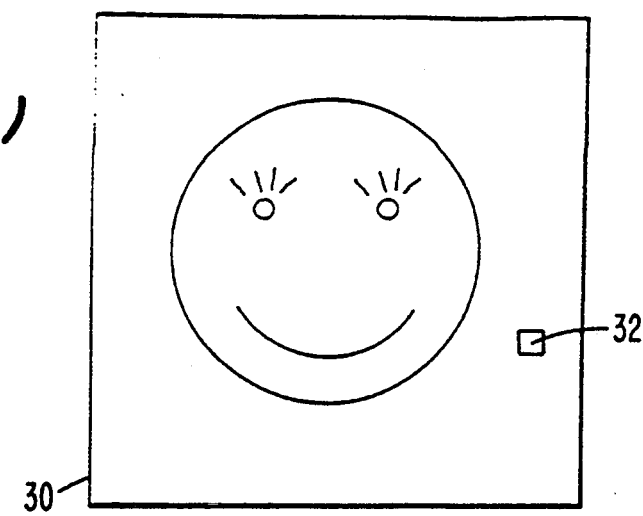
FIG. 1 (comprising FIGS. 1a-1c) shows a digitized black and white image and the process of dividing the image into domain blocks.

FIG. 1a shows an image 30. Image 30 is formed of a large number of individual picture elements, or pixels, 32, each of which exhibits a specific pixel value. If image 30 is a black and white image, then pixels 32 have one of only two possible values, black or white. Alternatively, if image 30 is a gray scale, pixels 32 can also exhibit a larger number of values representing different levels of gray. For a typical gray scale image, pixels 32 may exhibit one of two hundred fifty-six shades of gray. In a color image, pixels may exhibit multiple degrees of brightness and multiple hues. The pixel values may be expressed numerically. For example, black and white pixel values may be expressed as 1 or 0. Gray scale pixels may be expressed as a value from 0-255. Color pixels may be expressed by a luminance Y and chrominances U, V, each with values of 0-255.

Figure 1B:
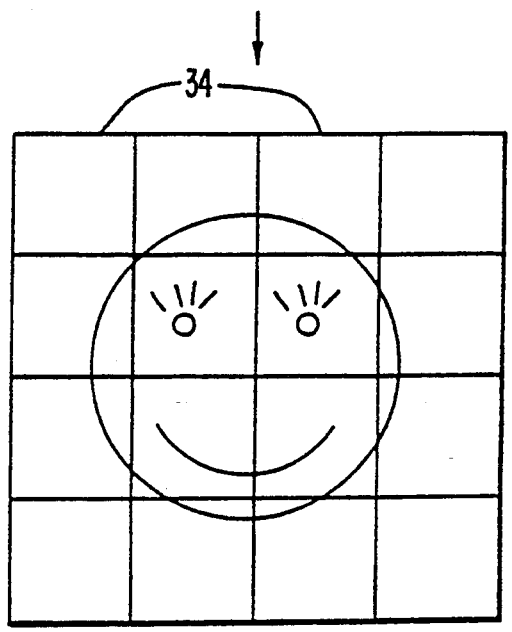
Figure 1C:
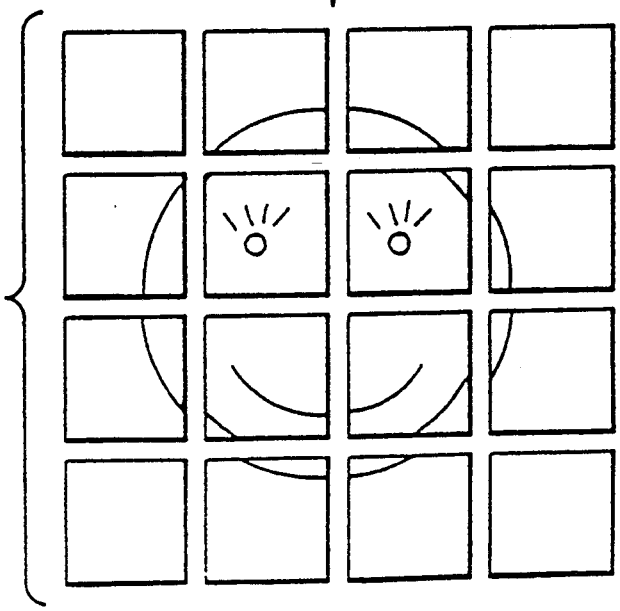

The first step in compressing data through the use of a fractal transform is to subdivide the image data into a plurality of domain blocks 34, as shown in FIGS. 1b and 1c. Domain blocks 34 are uniquely addressable blocks each representing a different portion of the image information, such that all domain blocks together contain all of the image information contained in image 30. Domain block data includes the set of numeric pixel values of the pixels contained in a corresponding domain block.

Use of the fractal transform method requires that image 30 also be subdivided in a different manner, as shown in FIG. 2. In particular, image 30 is subdivided into a plurality of uniquely addressable mapped range blocks 36. Each mapped range block 36 corresponds to a different subset of the image data, with each subset having a unique address with respect to the image data. Preferably, the range blocks have a greater number of pixels than the domain blocks.

A shrinking, or averaging, process is then executed upon range blocks 36 to produce shrunken range blocks 42, as shown in FIG. 3. Each shrunken range block may be identified by the same identifier as the corresponding unshrunken range block. Pixel values of shrunken range blocks 42 are expressed numerically to form shrunken range block data. Various techniques may be employed in the process of producing shrunken range block data representing shrunken range blocks 42. Suitable methods are described in detail in the aforementioned U.S. patent applications Ser. No. 07/375,840, now U.S. Pat. No. 5,065,447 and 07/581,586. Alternatively, a shrinking process can be formed on pixels of image 30 prior to forming the averaged pixels into shrunken range blocks.

The process of compressing digital data through the use of a fractal transform generally consists of comparing each domain block with all of the shrunken range blocks and selecting the shrunken range block which is most similar to the specified domain block. The fractal transform of a particular domain block consists of the identifier of the shrunken range block which provides the closest match to the particular domain block. The fractal transform of an image comprises the set of fractal transforms of all individual domain blocks of the image.

In order to provide most efficient data compression, it is desirable to have many choices against which the specified domain block may be compared. One method of increasing the number of choices is to apply affine transforms to each of the shrunken range blocks. For example, each shrunken range block may be rotated by 90° to provide an additional shrunken range block with which the domain blocks may be compared. It can be appreciated that no additional data is required in order to generate such additional shrunken range block. All that is necessary is to apply a mathematical operation to the data representing the first shrunken range block. As disclosed in the aforementioned U.S. patent applications, additional shrunken range blocks may be obtained by rotating by different amounts, for example, 180° and 270°. Further shrunken range blocks may be provided by inverting each of the rotated shrunken range blocks. To facilitate explanation, data representing numeric pixel values of shrunken range blocks will hereinafter be referred to as "range block data."

Figure 4:
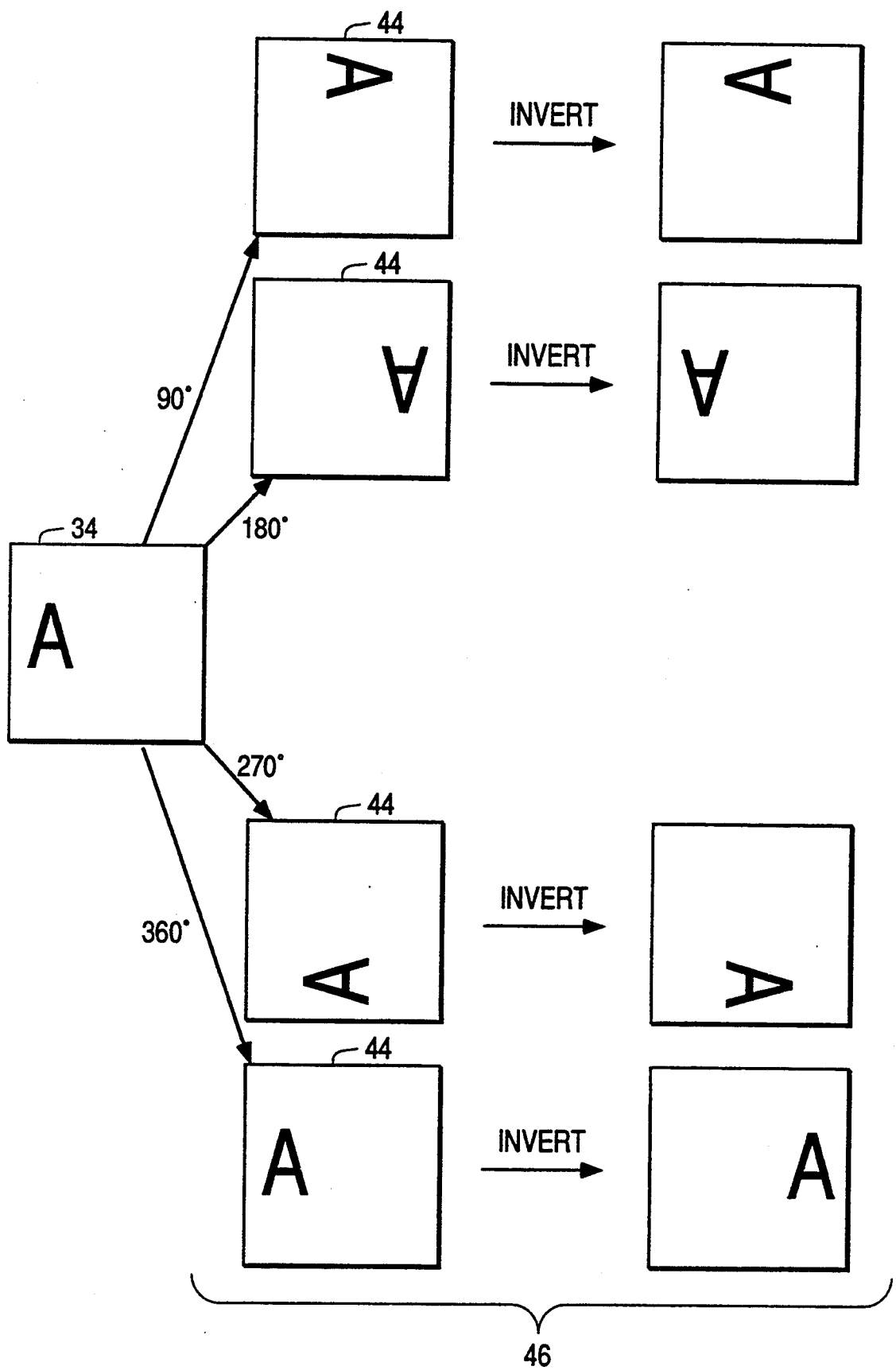
FIG. 4 shows a series of eight orientation blocks corresponding to a domain block.

Alternatively, and in a completely equivalent manner, each domain block may be operated upon by affine transforms to generate additional choices In the preferred embodiment, each domain block is rotated by 90°, 180°, 270° and 360° to generate a set of rotation blocks each corresponding to a specified domain block. This procedure is shown in FIG. 4, wherein a selected domain block 34 is subjected to rotations of 90°, 180°, 270° and 360° to obtain orientation blocks consisting of rotation blocks 44. Similarly, each rotation block 44 is subjected to inversion to produce orientation blocks 46.

The process of determining the best match consists of comparing data representing domain blocks, orientation blocks, and range blocks using the concept of "image distance." As explained more completely in the aforementioned U.S. patent applications, blocks of data representing two images may be processed mathematically to generate an image distance value which is proportional to the degree of similarity between the image blocks. Various types of image distance comparisons may be made, depending on the particular mathematical procedure employed. Specific examples of image distance types well known to those skilled in the art include the Hausdorff distance and the L2 distance. The preferred embodiment of the invention compares image blocks using the concept of L2 distance.

When the fractal transform of each domain block has been obtained, the fractal transform of image 30 can be expressed as the set of fractal transforms for each domain block. The fractal transform of image 30 can be expressed in digital form with many fewer bits than digital data corresponding to each pixel of image 40. The fractal transform thus represents a significant data compression.

Figure 5:
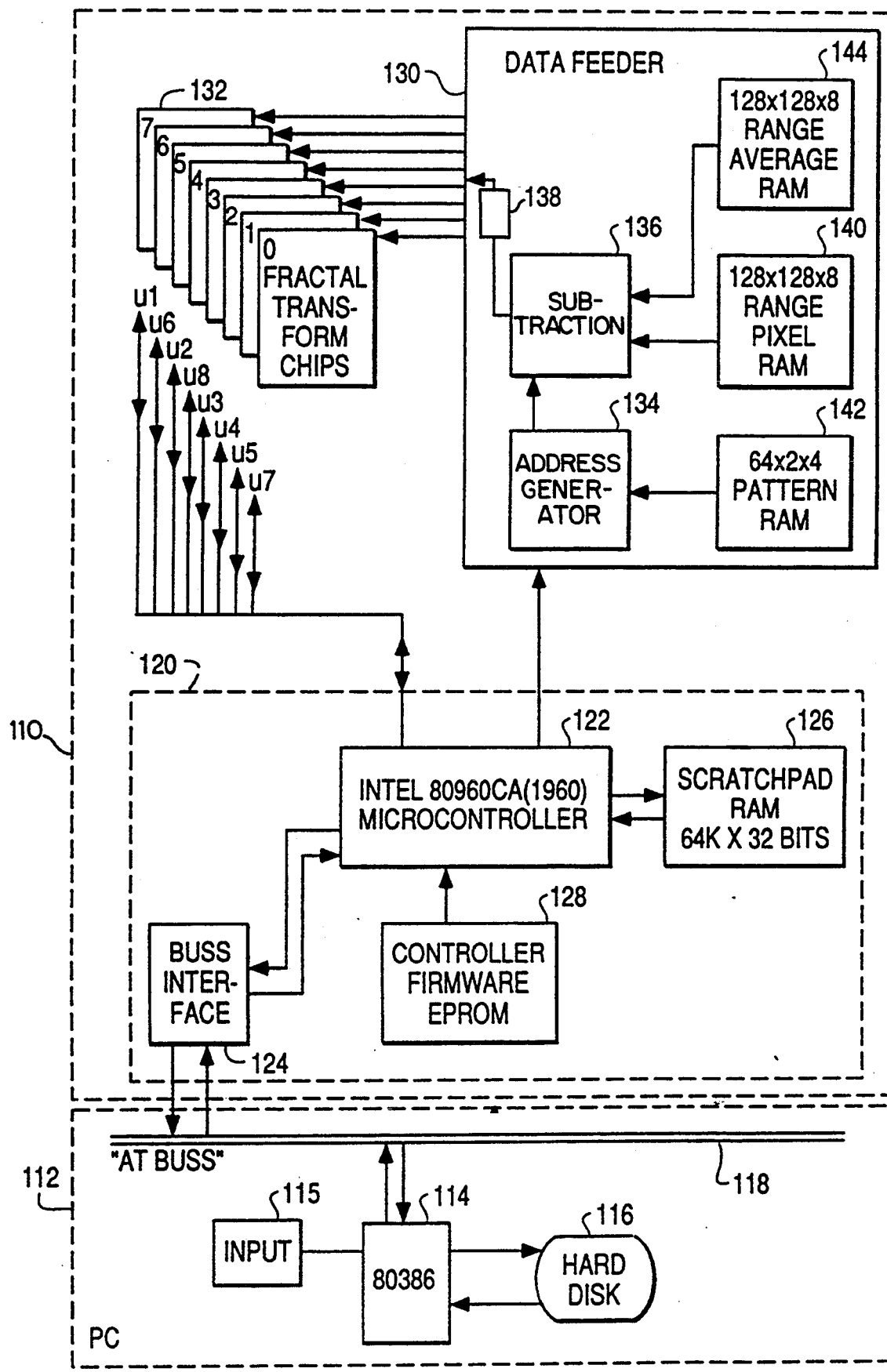
FIG. 5 shows a block diagram of a fractal transform compression board, which constitutes a preferred embodiment of the present invention.

With the above described general principles in mind, a preferred embodiment of the invention will now be described in the form of a removably connected, or plug-in, circuit board 110 for use with a host computer, or personal computer (PC), 112 as shown in FIG. 5. PC 112 may comprise, for example, a model AT personal computer manufactured by the IBM Corporation. PC 112 includes a processor chip such as a Model 80286 or 80386 processor 114, and related circuits (not shown), coupled to a hard disk 116. PC 112 also includes an AT bus 118 to which board 110 is coupled, and an input device 115 such as a scanner. As is well known in the art, PC 112 includes a plurality of slots electrically connected in parallel with bus 118 to permit a plurality of peripheral circuit boards, such as board 110, to be mechanically and electrically connected on a plug-in basis to PC 112.

As shown in FIG. 5, board 110 includes a controller circuit 120. Controller circuit 120 includes a controller chip 122 which, in the preferred embodiment, comprises a Model 80960CA(I960) microcontroller chip manufactured by the Intel Corporation. Controller circuit 120 also includes a bus interface circuit 124 which implements communication between controller chip 122 and PC 112.

Controller circuit 120 further includes a random access memory (RAM) 126 used for scratchpad and program storage, and an erasable programmable read-only memory (EPROM) 128 containing firmware for executing processes by microcomputer chip 122 and for "booting up" board 110. Firmware contained in EPROM 128 will be described below in greater detail. Controller circuit 120 also includes standard interfacing and peripheral circuits (not shown) for microcontroller 122.

Board 110 also includes a data feeder circuit 130 and a plurality of transform circuits 132. Transform circuits 132 perform the bulk of the intensive calculations of image distance necessary to determine the best match between domain data and range data. In the preferred embodiment, eight transform circuits 132 are included, each implemented in the form of an identical application-specific integrated circuit (ASIC). However, a greater or lesser number of transform circuits may be provided, as determined by requirements of the specific application. The provision of a plurality of transform circuits enables the simultaneous processing of data, in a manner to be described more completely below, which permits the present invention to perform image data compression at a high rate of speed.

Feeder circuit 130 includes an address generator circuit 134, a subtraction circuit 136, and a final resynchronizing chip 138 for synchronizing the output signal with a clock timer. In the preferred embodiment, chip 138 is a Texas Instruments type SN74BCT29281 integrated circuit. Address generator circuit 134 and subtraction circuit 136, in the preferred embodiment, are implemented in the form of an ASIC. Structural details of circuits 134 and 136 will be provided below.

Data feeder circuit 130 also includes three random access memories (RAMs) 140, 142, and 144. RAM 140 is a range pixel memory, preferably 128×128×8 bit. The purpose of range pattern memory 140 is to store pixel data supplied by controller circuit 122 as range pixel data.

RAM 142 forms a range pattern memory. RAM 142 stores information received from controller circuit 120 which specifies a pattern of pixels of range data which will form range blocks. In the preferred embodiment, range pattern RAM 142 consists of a 64×2×4 bit memory.

Finally, data feeder circuit 130 includes a range average RAM 144 for storing average pixel values of range blocks formed from pixel data stored in RAM 140.

Figure 6:
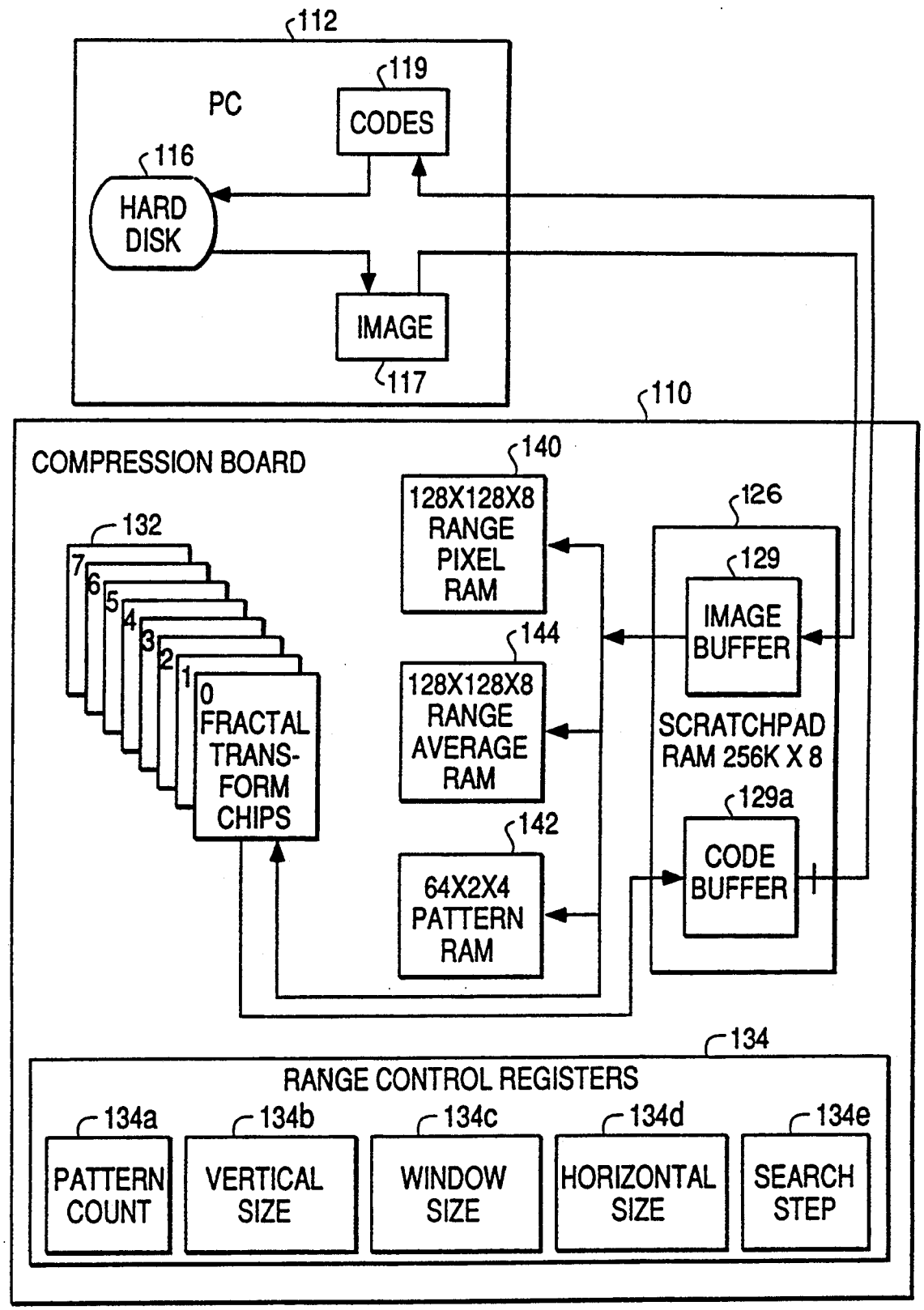
FIG. 6 is a generalized data flow diagram of the fractal transform compression board of FIG. 5.

General operation of board 110 will now be described. The generalized data flow is indicated in FIG. 6. Raw image data, consisting of pixel data of a specified image, is supplied to PC 112 by any conventional manner, such as through scanner 115, and is stored upon hard disk 116. When it is desired to produce compressed data representing the image corresponding to the data stored in hard disk 116, the raw pixel data for the desired image is loaded through a buffer 117 in PC 112 into a buffer 129 in scratchpad memory 126. In the preferred embodiment, an image to be compressed consists of an array of 320×200 pixels.

Controller circuit 120 subdivides the pixel data for the image stored in buffer 129 into a first group of subsets of data which form domain blocks, which in the preferred embodiment consists of a 40×25 grid of 8×8 pixel blocks. Controller circuit 120 also forms a set of orientation blocks for each of the domain blocks. The orientation blocks for each domain block consist of four rotation blocks respectively representing a rotation of the domain block by 90°, 180°, 270° and 360°. (The 360° rotation block is, of course, identical to the original domain block). Controller circuit 120 performs an inversion process on each of the four rotation blocks to form four additional orientation blocks consisting of the inversion of the rotation blocks. Thus, for each domain block, controller circuit 120 generates a set of eight blocks of data each representing a different orientation block, as shown in FIG. 4. Each transform circuit 132 is loaded with data representing the eight orientation blocks of a different domain block. Thus the eight transform circuits together store data representing sixty four orientation blocks.

Controller circuit 120 also generates, for each domain block, a domain average value consisting of the average pixel value of all pixels in the domain block. Since the same pixels form the eight orientation blocks associated with each domain block, each of the eight associated orientation blocks has the same average pixel value. Domain average values are supplied to respective transform circuits 132.

Controller circuit 120 also subdivides the image data stored in buffer 129 into a second group of subsets to form range blocks. This is achieved by subdividing the pixel data for the image (the same pixel data as used to form domain blocks)into blocks containing four times as many pixels as each domain block. These blocks are then shrunken on a 4:1 ratio to form range block data, consisting of range pixel data. For example, a shrunken range block can be formed by selecting every other pixel of the original range block Alternatively, each pixel of a shrunken range block can be formed by calculating the average pixel values of four-pixel squares, the upper left pixel of each square consisting of every other pixel of the original unshrunken range block. A 4:1 shrink ratio applied to the original 320×200 image pixel array yields a range pixel array of 160×100 pixels. It is to be understood that other shrinking ratios and/or algorithms could be used as desired.

Controller circuit 120 then forms the range pixel data into range blocks by specifying the order in which pixels of the range pixel data form the range blocks.

Controller circuit 120 then loads feeder circuit 130 with range block data. In particular, range block pixel data for the image is loaded into range pixel RAM 140 of feeder circuit 130, and range block average values for each range block are loaded into range average RAM 144. Range pattern RAM 142 is loaded with data specifying the order in which pixels of RAM 140 form a block. In the preferred embodiment, this data consists of x,y pixel locations 0,0; 0,1; 0,2; 0,3; 0,4; 0,5; 0,6; 0,7; 1,0; 1,1; . . . 7,5; 7,6; 7,7; thereby specifying an 8×8 pixel block.

Figure 7:
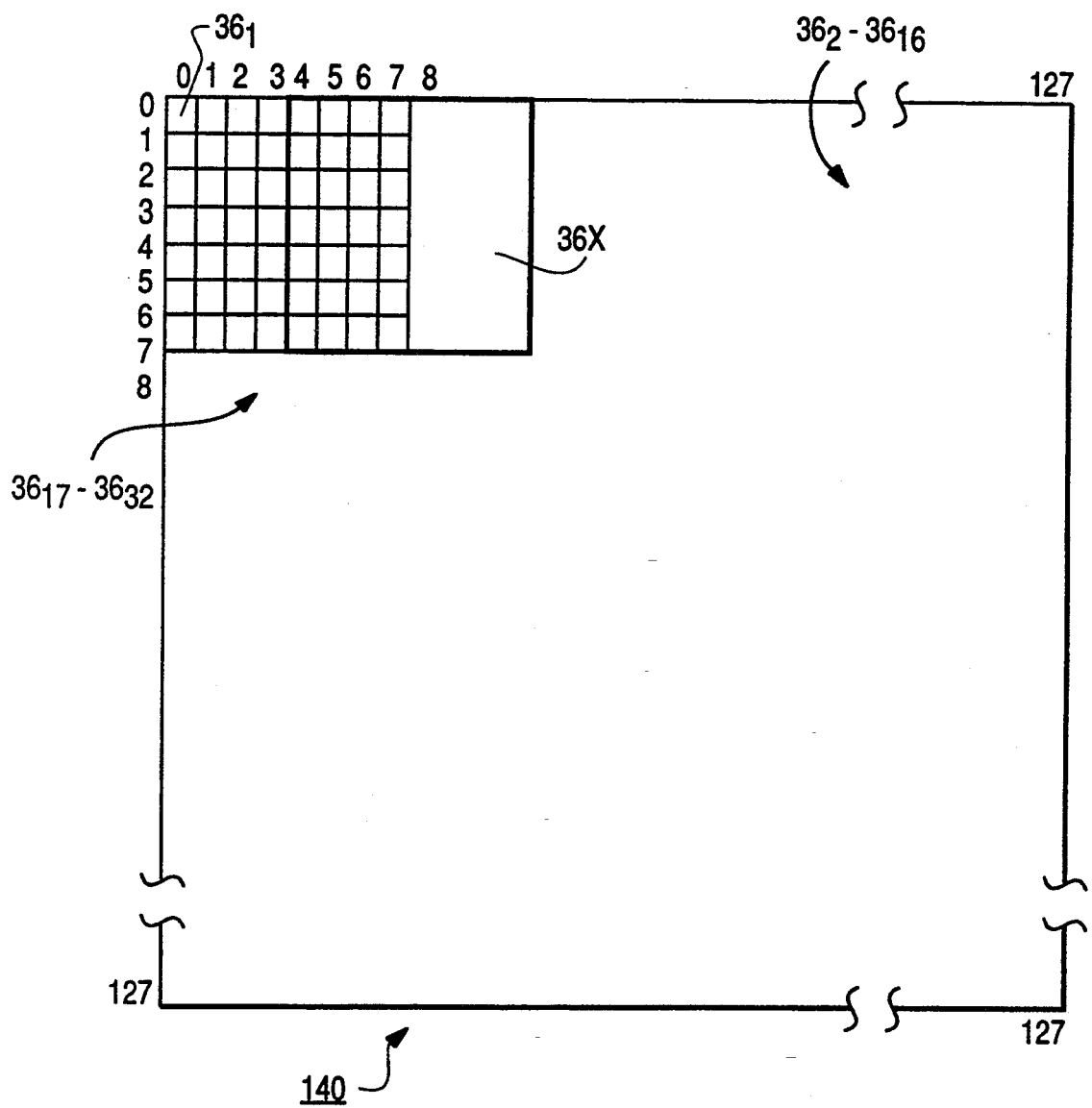
FIG. 7 shows the formation of range blocks from pixel data stored in a range pixel RAM of FIG. 5.

As noted above, improved performance is obtained when a large number of choices are available for comparisons between domain block data and range block data. The present invention provides an increased number of choices by providing for multiple configurations of range blocks using the range pixel data stored in RAM 140. Variable offsets are used, as illustrated in FIG. 7, which shows a detailed diagram of range pixel data storage in RAM 140. Numbers along the lower edge of FIG. 7 indicate pixel column numbers, and numbers along the left edge of FIG. 7 indicate pixel row numbers.

A first range block $36_1$ is configured as an $8 \times 8$ block of pixel data located at the upper left corner of RAM 140. Fifteen additional range blocks $36_2$–$36_{16}$ begin at the right edge of range block $36_1$ (at column #8) and extend to the right boundary of RAM 140, and another fifteen range blocks $36_{17}$–$36_{32}$ begin at the lower border of range block $36_1$ (at row #8) and extend to the lower boundary of RAM 140. Thus, two hundred fifty-six range blocks are formed in RAM 140.

Additional range blocks can also be formed as $8 \times 8$ blocks offset from the edge of RAM 140. For example, a set of $8 \times 8$ range blocks beginning with an $8 \times 8$ range block $36_x$ can be formed as shown in FIG. 7, with the four left hand columns of block $36_x$ beginning at column 4 of the array. The right hand columns of the eighth range block to the right of block $36_x$ are "folded back" to include columns 0–3 of FIG. 8. The offset between the left hand edges of consecutive range blocks is referred to as the "gap." In this manner, a large number of range blocks can be formed from range pixel data stored in RAM 140.

In order to specify the manner in which range blocks are formed from data in range pixel RAM 140 by address generator circuit 134, controller circuit 120 loads range control registers 134*a*, 134*b*, 134*c*, 134*d*, and 134*e* of address generator 134 with certain control parameters. Specifically, the information stored in the five range control registers of address generator 134 (FIG. 6) is as follows:

134*a*—A pattern count register which contains the number of pixels in the range block. For example, for an $8 \times 8$ range block, the value stored in this register is 64.

134*b*—A Vertical Size register which contains the difference between the vertical size of the area of pixel RAM 140 to be designated as a start point for a range block and the vertical size of the range block. For a range pixel array of size $160 \times 100$ and an $8 \times 8$ range block size, the value stored in this register is $(100 - 8) = 92$.

134*c*—A Window Size register which contains a number to limit the portion of the range pixel array stored in RAM 140, in the vertical direction, which will be used to generate range blocks. In the example noted above with a vertical array dimension of 100 and an $8 \times 8$ range block, this number will be between 8 and 100.

134*d*—A Horizontal Size register contains the difference between the horizontal size of the area of pixel RAM 140 to be designated as a start point for a range block and the horizontal size of the range block. For a range pixel array of size $160 \times 100$ and an $8 \times 8$ range block size, the value stored in this register is $(160 - 8) = 152$.

134*e*—A Search Step register contains a number which determines the gap between consecutive range blocks.

Control circuit 120 also loads pixel average values for multiple range blocks in RAM 144, which has the capacity to store average values for 128 times 128 eight-bit average values. In particular, the range pixel average values are stored in RAM 144 at an address corresponding to the address of the upper left corner of the corresponding range block in RAM 140.

At this point, orientation block data for eight domain blocks has been respectively loaded into transform circuits 132, and range block data has been loaded into RAMs 140, 142, and 144 of feeder circuit 130. Controller circuit 120 then initiates a simultaneous comparison operation by causing data feeder circuit 130 to simultaneously supply range block data to each transform circuit 132 such that each transform circuit 132 simultaneously calculates the L2 distance between each of the orientation blocks stored therein and a first range block stored in feeder circuit 130. At the end of this calculation, each transform circuit 132 stores the smallest L2 distance calculated between the eight orientation blocks stored therein and the range block of feeder circuit 130, along with the identifier of the orientation block which resulted in such least L2 distance.

Data from a next range block is then supplied to transform circuits 132 to permit calculation of L2 distances between the orientation blocks stored therein and the next range block. If a smaller L2 distance is obtained, the transform circuit overwrites the previous smallest L2 distance with the new smallest L2 distance, along with the identity of the orientation block and range block resulting in such new smaller L2 distance. Similar calculations are performed for each range block formed from data stored in feeder circuit 130.

If the range block data generated from the received image data by controller circuit 120 is greater than the capacity of range pixel RAM 140, then such data is divided into portions and loaded sequentially to permit calculations comparing the loaded domain blocks with all of the range block data. At the conclusion of such calculations and comparisons for the orientation blocks stored in transform circuits 132, data feeder circuit 130 causes an interrupt to be generated to controller circuit 120. This interrupt causes controller circuit 120 to read from circuits 132 the least L2 distance calculated, the identity of the orientation block which resulted in such least L2 distance, and the identity of the range block which resulted in such least L2 distance, and to store this data in a buffer 129*a* (FIG. 6). Controller circuit 120 forms these three quantities into values which comprise the fractal transforms of the eight domain blocks stored in the eight transform circuits 132. At this point, board 110 has calculated a fractal transform for each of eight domain blocks.

Controller circuit 120 then loads orientation block data for the next eight domain blocks into transform circuits 132. This newly loaded data is then used to determine the least L2 distances between the orientation blocks represented by the newly loaded data and each of the range blocks, in the same manner as described above. At this point, fractal transforms for the second set of eight domain blocks have been obtained. In a similar manner, controller circuit 120 retrieves the fractal transforms, sequentially loads orientation block data for each of the remaining domain blocks into transform circuits 132, and determines the closest match between such orientation blocks and each of the range blocks. At the conclusion of this process, controller circuit 120 will have obtained fractal transforms for each domain block of the original image. Controller circuit 120 then transmits these fractal transforms, plus data reflecting the L2 distances for each domain block, to a buffer 119 in PC 112 for formulation into a final compressed data image file. Such formulation comprises no part of the present invention, and thus will not be described in detail.

The range data is loaded in three pieces, some of which remain the same throughout segments of the calculation cycle. Range pattern RAM 142 holds the pattern of pixels which together form a range block. This information is typically loaded only once per block size and shape. Range pixel RAM 140 contains the actual range pixel values, and may be loaded several times per domain block load to do comparisons over the entire image. Range average RAM 144 must be loaded as often as range pixel RAM 140, since RAM 144 contains the average values for the range blocks currently in the range pixel RAM 140. Control register 134a–e for controlling the generation of range blocks from range data must be loaded each time a calculation cycle is initiated.

Controller circuit 120 communicates with PC 112 via four communications ports: one sixteen-bit data port, one eight-bit command port, one eight-bit status port, and one eight-bit control port. The data port is unidirectional, and its direction is controlled by a bit in the control port. The command port is bidirectional, and is a read-through port whose bits toggle various hardware functions. The status port principally reports the status of data at, and access to, the command and data ports. The control port is mapped into the I/O address space on the PC bus, and is used to control data transfers between controller 120 and the program running on PC 110.

Details of interface techniques effectuated by the above described ports are well known to those skilled in the art, and will not be described in detail. However, signals appearing in the control port and status port are respectively described in Tables 1 and 2.

TABLE 1

| BIT | NAME | Description |
|---|---|---|
| 0 | UPCTRL_D0 | Not Defined |
| 1 | UPCTRL_D1 | Not Defined |
| 2 | UPSW_RESET | i80960 and Board Reset This is the software reset bit. Setting this bit to a value of '1' and then '0' causes the boardcontrol logic and 960 processor to reset. |
| 3 | UPCRD_INTEN | 960 Cmd Port Read Interrupt Enable Setting this bit to a value of '1' causes the 960 processor to be interrupted every time the PC bus performs a read of the FTCB's command port. |
| 4 | UPDAT_INTEN | 960 Data Port Ready Interrupt Enable Setting this bit to a value of '1' causes the 960 to be interrupted every time the PC places a data value in the data port for the 960 to read. This is used to handshake the transfer of data between the PC and the 960 processor during image data loading. |
| 5 | UPCWR_INTEN | 960 Cmd Port Write Interrupt Enable Setting this bit to a value of '1' will cause the 960 processor to be interrupted every time the PC writes data into the FTCB Cmd Port. |
| 6 | UPCTRL_D6 | Not Defined |
| 7 | UPCTRL_D7 | Not Defined |

TABLE 2

| BIT | NAME | Description |
|---|---|---|
| 0 | UPCTRL_D0 | Not Defined (Used for diagnostics purposes) |
| 1 | UPCTRL_D1 | Not Defined (Also used for diagnostics) |
| 2 | GND | Always '0' |
| 3 | GND | Always '0' |
| 4 | GND | Always '0' |
| 5 | UPCMDRD_OK | Command Port Read Data Valid This bit is set to a value of '1' by the PC after it has written a valid data byte into the command port. |
| 6 | UPCMDWR_OK | Command Port OK to Write Data This bit is set to a value of '1' by the 960 processor after it has read the data value in the command port. |
| 7 | UPDAT_PORT_RDY | Data Port Data Ready This bit value is set to a '1' after either the 960 or the PC has placed data into the data port for the other processor to read. This bit is used to handshake between the PC and 960 during data transfers. |

The configuration of address space in controller circuit 120 is shown in FIG. 8. The 256K RAM 126 occupies the area from 10000000 to 1003FFFF in the virtual address space of controller chip 122. Of this, the area from 10000000 to 10001E00 is for system space, cache, and control tables by controller chip 122. The application program space is therefore 10002000 to 1003FFFF.

The area above 10040000 in the virtual address space of controller chip 122 is occupied by mapped-in special purpose ports, registers, and RAM for the other chips on the board. These include communications ports for communicating with the PC, the control registers for accessing and setting transform circuits 132 and the data feeder circuits 136 and 138, and the RAM occupied by the domain and range blocks, the range patterns, and the various averages.

The area between 2000000 and 2007FFFF is devoted to registers and RAM on transform circuits 132, including a list of domain blocks which have been sent to circuits 130 and 132. Each circuit 132 is mapped in at 200X0000 where x is the number of the circuit. 132. The low area of each circuit's space is devoted to the control registers and the domain block's L2 average, and the rest of the area is divided into four channels, each channel containing the information for two of the eight orientations of a domain block. The space from 30000000 to 60003FFF is devoted to data feeder 130, including a list of range blocks which have been sent to circuit 130. This space also contains the control registers for ASICs 134 and 136 which control the range data stream, as well as RAMs 140, 142, and 144. The communications interface with the PC is mapped into the space between 7000000 and 70000007. This area contains the 16 bit data port, the 8 bit control and status registers, and the 8 bit command port.

Finally, the area above FFFF8000 is devoted to firmware in EPROM 128.

In the preferred embodiment, each transform circuit 132 comprises a separate ASIC, the structure of which will be described in detail with respect to FIG. 10. Each circuit 132 consist of four identical channels which each perform a pipeline series of calculations to compute a minimum L2 distance, given in Equation (1).

$$L2_{min} = \min_j \left\{ \sum_i (\{z_i - [\bar{z} + (pw_{ij} - p\bar{w}_j)]_{truncate}\}^2/4) \right\} \quad (1)$$

where

0<i<number of pixels per block
0<j<number of blocks in range

Figure 9:
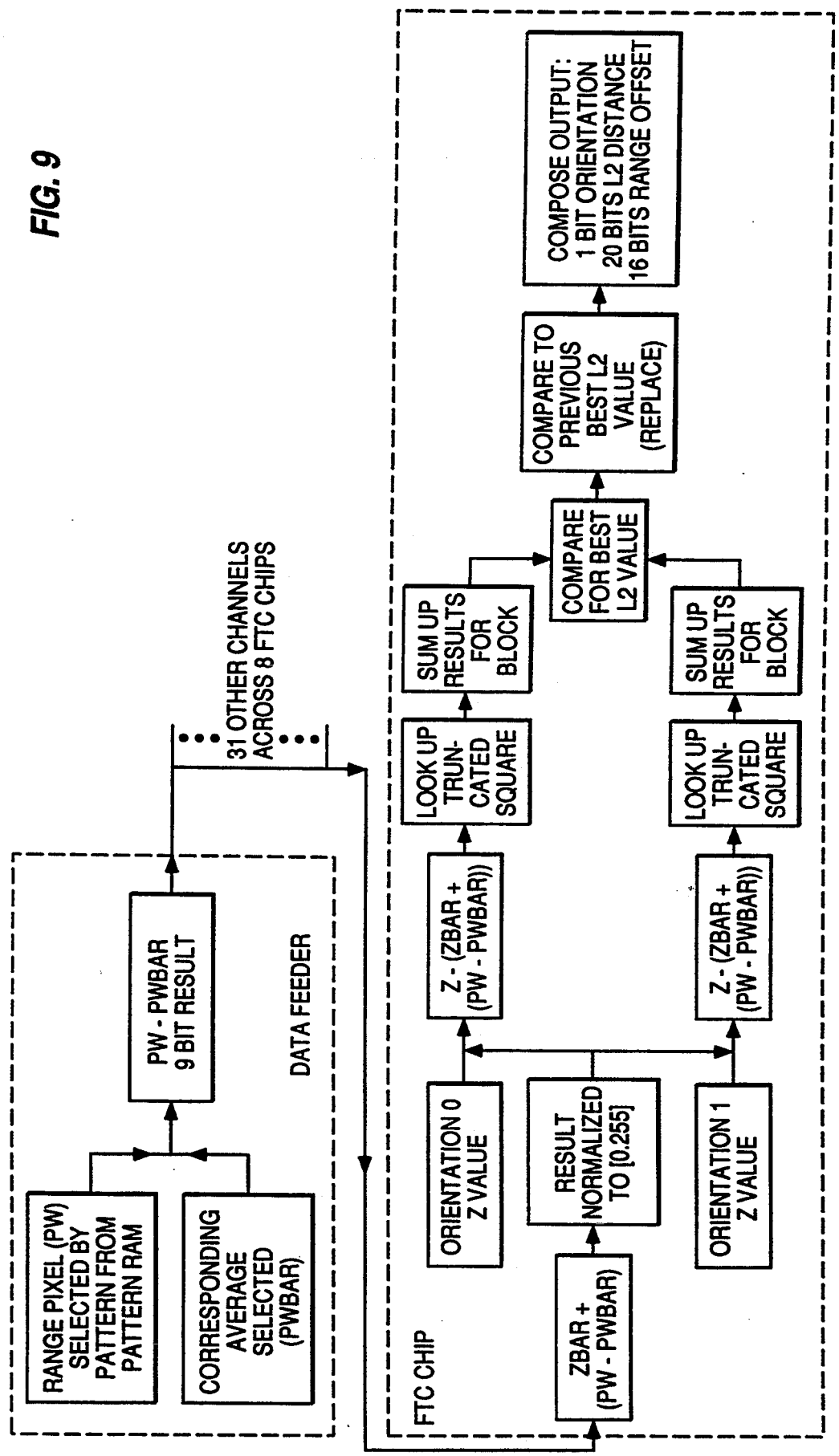
FIG. 9 shows the processing steps performed by ASICs of the data feeder circuit and transform circuits of FIG. 5.

The calculation of equation (1), as shown in FIG. 9, is performed as follows, with each of the four channels in each of eight transform circuits 132 simultaneously executing one step per clock cycle:

1) difference between the range average (pwbar) and the range pixel value (pw) is supplied from the data feeder circuit;
2) the domain average (zbar) is then added to the difference calculated in step 1 and the resulting sum is truncated;
3) the truncated sum is then subtracted from the domain pixel value (z);
4) the resulting difference is squared via lookup table (contained in an internal ROM on transform circuit 132) to obtain a squared value, modulo four, which forms one summand in the L2 distance for the orientation block;
5) each half of the channel, containing pixels from the two orientations, is then summed individually;
6) the resulting L2 distances of the two channel halves are then compared, and the best (lowest) L2 distance value orientation is chosen;
7) the lowest L2 distance value of step 6 is then compared to the absolute lowest L2 distance value chosen since the pipeline was initialized;
8) if the new L2 distance value is lower than the previous lowest L2 distance value, the new value replaces the previous lowest value, and the orientation, the L2 value, and the relative address of the range block which achieved it are written to the transform circuit output.

Figure 10:
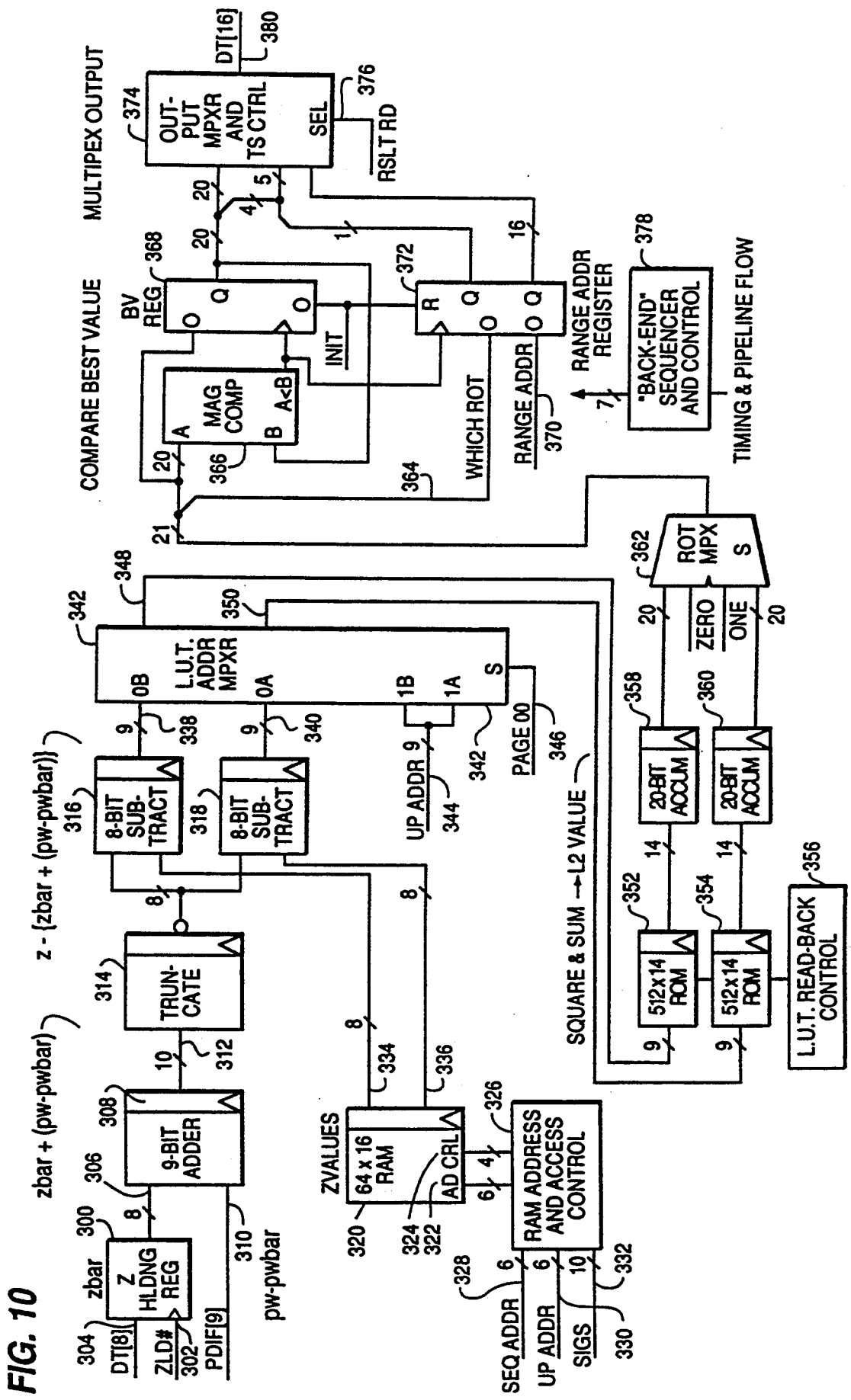
FIG. 10 is a partial block diagram of one of the transform circuits shown in FIG. 5.

Details of the circuitry of circuit 132 which performs the above-described calculations are shown in FIG. 10. A register 300 receives a domain average pixel value zbar from controller circuit 120 in response to a data load signal supplied to a terminal 302. Upon receipt of a data transmit signal from data feeder circuit 130 at a data transmit terminal 304, register 300 supplies the domain average pixel value over an eight-bit bus to an input terminal 306 of a nine-bit adder 308. Another input terminal 310 receives a nine-bit quantity pw-pwbar, comprising an intermediate range value, from data feeder circuit 130. In the preferred embodiment, this quantity consists of the difference between a single pixel value of a range block and the average pixel value for that range block.

Adder 308 provides the result over a ten-bit bus 312 to a truncation circuit 314 which normalizes the value received over bus 312 to a value between 0 and 255. That is, any value less than 0 is set equal to 0, and any value greater than 255 is set equal to 255.

The output of truncation circuit 314 is supplied to first inputs of a pair of subtraction circuits 316, 318.

Each channel of transform circuit 132 also includes a 64×16 RAM 320 for storing pixel values of one rotation block and the inversion of such rotation block. Since there are four channels in each transform circuit 132, each transform circuit 132 includes sufficient memory to store all eight orientation blocks corresponding to a single domain block.

RAM 320 includes a six-bit address input 322 and a four-bit control input 324. Signals are supplied to inputs 322 and 324 by a RAM access and control circuit 326 which receives as inputs a six-bit sequence address signal 328 from data feeder circuit 130, a six-bit microprocessor address signal 330, and a ten-bit timing control and memory strobe signal 332. Address signal 328 specifies the desired pixel value of the orientation block to be supplied for calculation. Signal 330 is supplied from microcontroller 122 for the purpose of reflecting domain memory contents during output. Signal 330 is the lower six bits of the address bus of controller 120. Signal 332 is supplied from standard devices for the purpose of forming a generic timing sequence.

RAM 320 includes all pixel values for one rotation block corresponding to a domain block. RAM 320 also contains all pixel values of the inversion of such rotation block. Corresponding individual pixel values of the rotation block and its inversion are simultaneously supplied in parallel over eight-bit buses 334 and 336 to second inputs of subtraction circuits 316 and 318, respectively. Circuits 316 and 318 thus produce the quantity z-[zbar+(pw-pwbar)] for the rotation block and its inversion over outputs 338 and 340, respectively. Outputs 338 and 340 are supplied to a look-up table (LUT) address multiplexer 342. Other inputs to multiplexer 342 include a nine-bit microprocessor address signal 344 supplied from controller 120 and a page input signal 346 supplied from 326. Signal 344 performs the function of addressing the LUT during access by controller 120 for test purposes. Signal 346 performs the one-of-eight LUT select for subsequent readout to controller 120. Multiplexer 342 includes first and second outputs 348 and 350 which are supplied to a pair of ROMs 352, 354. ROMs 352 and 354, under control of a look-up table readback control circuit 356, perform a high-speed squaring operation using values stored in ROMs 352 and 354, in a manner well known in the art. Accordingly, details of such squaring operation will not be provided.

The squares of the quantity z-[zbar+(pw-pwbar)] for the rotation block and its inversion are summed in a pair of twenty-bit accumulators 358, 360. Accumulators 358 and 360 store the sums of the squares of quantities calculated for each pixel value of the rotation block and its inversion. The outputs of accumulators 358 and 360 are supplied to a rotation multiplexer 362. After all pixel values from the rotation block and its inversion have been mathematically processed, squared, and summed to produce the L2 value, rotation multiplexer circuit 362 supplies a twenty-one-bit output signal consisting of the accumulated L2 values from accumulators 358, 360, along with a rotation channel indication, over a signal line 364, of which orientation block (i.e., the rotation block or its inversion) provided the least L2 value. The selected L2 value is supplied to a magnitude comparator 366 and to a best value register 368. If the quantity supplied by rotation multiplexer 362 is less than the quantity currently stored in best value register 368, the output value of 362 is overwritten into best value register 368, and the signal on line 364 is stored, along with a range address signal 370, in a range address register 372. Outputs from best value register 368 and range address register 372 are supplied to an output multiplexer and tri-state control circuit 374. Also supplied to circuit 374 is a result read (RSLT RD) signal at a select terminal 376. Circuit 374 consists of the tri-state drivers which allow results from circuits 132 to be individually read back to controller 120.

As shown in FIG. 10, each channel of transform circuit 132 also includes a back-end sequencer and control circuit 378 which provides timing and pipeline flow functions. Circuit 378 provides a seven-bit output signal which manages the best value comparator circuits and generates timing signals for this operation.

Circuit 374 includes a sixteen-bit data output terminal 380, at which appears the calculated least L2 distance, the identifier of the orientation block which resulted in least L2 distance, and the identifier of the range block which resulted in such least L2 distance. Three sixteen bit words are downloaded to controller circuit 120 for each of the four channels of each of the eight chips.

In the preferred embodiment, the relative address of the range block is specified by the row,column (x,y) coordinate in RAM 140 of the pixel in the upper left corner of the range block. If range block data is separated into more than one portion in order to be loaded in to RAM 140, an offset is added to the x,y coordinate of the upper left pixel value, representing which portion of the range block data currently resides in RAM 140. The relative address of the range block constitutes its identifier.

Figure 11:
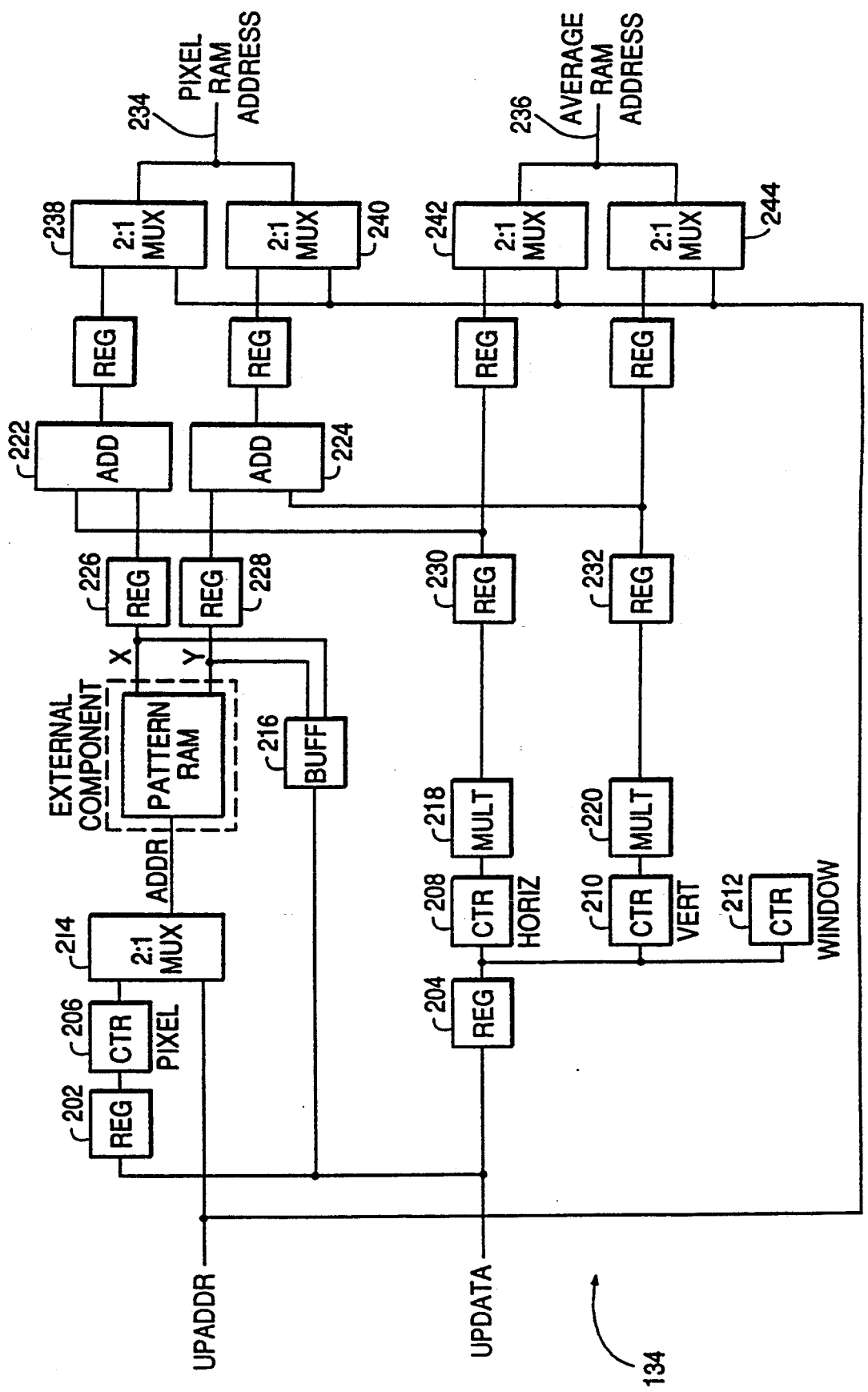
FIG. 11 is a block diagram of the address generator ASIC shown in FIG. 5

As noted above, data in feeder circuit 130 includes an address generator circuit and a subtraction circuit, formed by ASICs 134 and 136, and memory circuits 140, 142, and 144. Circuit 134 shown in more detail in FIG. 11. Input signals UPADDR and UPDATA are the address and data busses coming from controller 120. Registers 202 and 204 are respectively loaded from controller 120 with width and height values specifying the limit addresses from which range blocks will be formed, i.e., a "search window." Width and height information is then transferred into counters 206, 208, 210 and 212. A multiplexer 214 and a data transceiver (buffer) 216 provide controller 120 with access to the pattern RAM 142. Pattern RAM 142 is used to determine the shape of the search window. Multipliers 218 and 220 are used to control the gap. Once searching (i.e., range block formation) has been started by controller 120, counters 206, 208, 210 and 212 generate addresses to the pixel and average RAMs. Counter 206 generates pixel offsets within the search window. Counters 208 and 210 output the window offsets within the image area. Counter 212 controls when the window search has been completed, and it is time to move to another window. Adders 222 and 224 take the pixel offset X and Y addresses coming from pattern RAM 142 (via registers 226 and 228) and add them to the search window X and Y offsets coming from counters 208 and 210, via registers 230 and 232. Registers 226–232 serve as synchronization points for address information coming from pattern RAM 142 and the outputs of multipliers 218 and 220.

Address generator ASIC 134 outputs signals on two separate address busses 234 and 236. Bus 234 is coupled to pixel RAM 140, and bus 236 is coupled to average RAM 144, where average results are stored for all range blocks. Multiplexers 238, 240, 242 and 244 provide an address path to the pixel and average RAMs 140 and 144 so that controller 120 can load them with pixel data.

Figure 12:
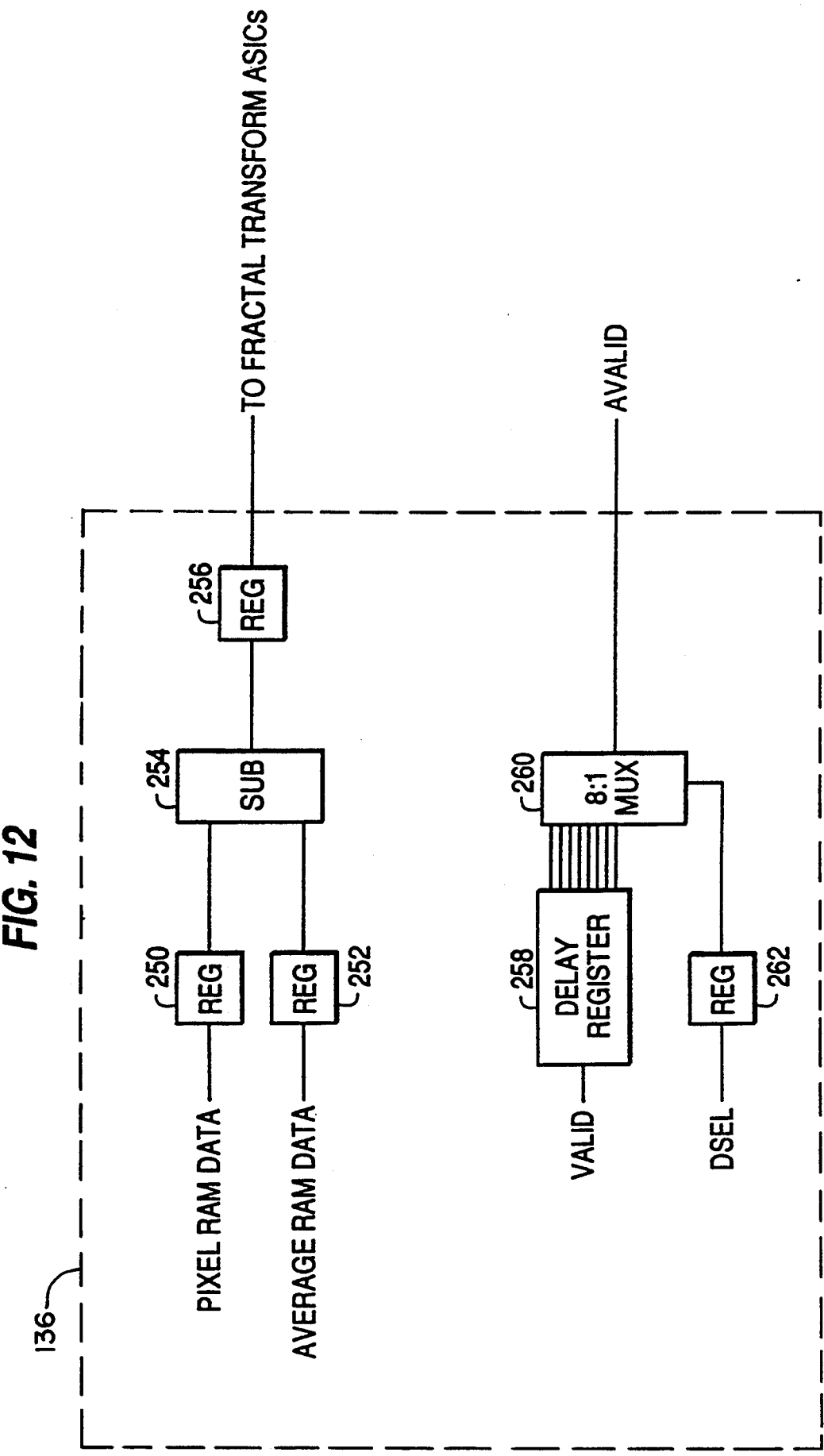
FIG. 12 is a block diagram of the subtraction ASIC shown in FIG. 5.

Referring now to FIG. 12, pixel data coming from the pixel and average RAMs 140 and 144 to ASIC 136 must first be subtracted. The two bytes of data, each on separate input busses, come into registers 250 and 252. They are next subtracted by subtraction circuit 254 and the 9-bit result is clocked into a register 256. It is from here that the resultant value will be loaded into the FTC's 132 for further calculation.

Another function inside ASIC 136 is to delay a VALID signal generated by FTC's 132 when a fractal transform has been computed. The amount of delay in this signal path is controlled by controller 120 through the programming of a register. The output of the desired FTC 132 is determined by a multiplexer 260 under control of a select signal from controller 120 received via a register 262.

Address generator 134 selects the proper pixel (pw) from range pixel RAM 140, and the proper average value (pwbar) from the range average RAM, in response to the pattern read from the pattern RAM, and feeds these to subtractor ASIC 136. Subtractor ASIC 136 does a full eight-bit subtract, resulting in a nine-bit result; one sign bit and an eight-bit mantissa. This nine-bit result, together with the address information about the location of the pixel in range pixel RAM 140, forms the input to transform circuit 132, to do the comparison with the domain block and domain average already stored there. The control registers for the address generating chip 134 are equipped with a hardware interrupt which signals controller circuit 120 ten clock cycles before the completion of the fractal transforms of the eight domain blocks stored in transform circuits 132. This allows controller circuit 120 to complete its current actions, become ready to receive the results of domain/range comparison, and to initiate the comparison cycle for the next eight domain blocks.

Figure 13:
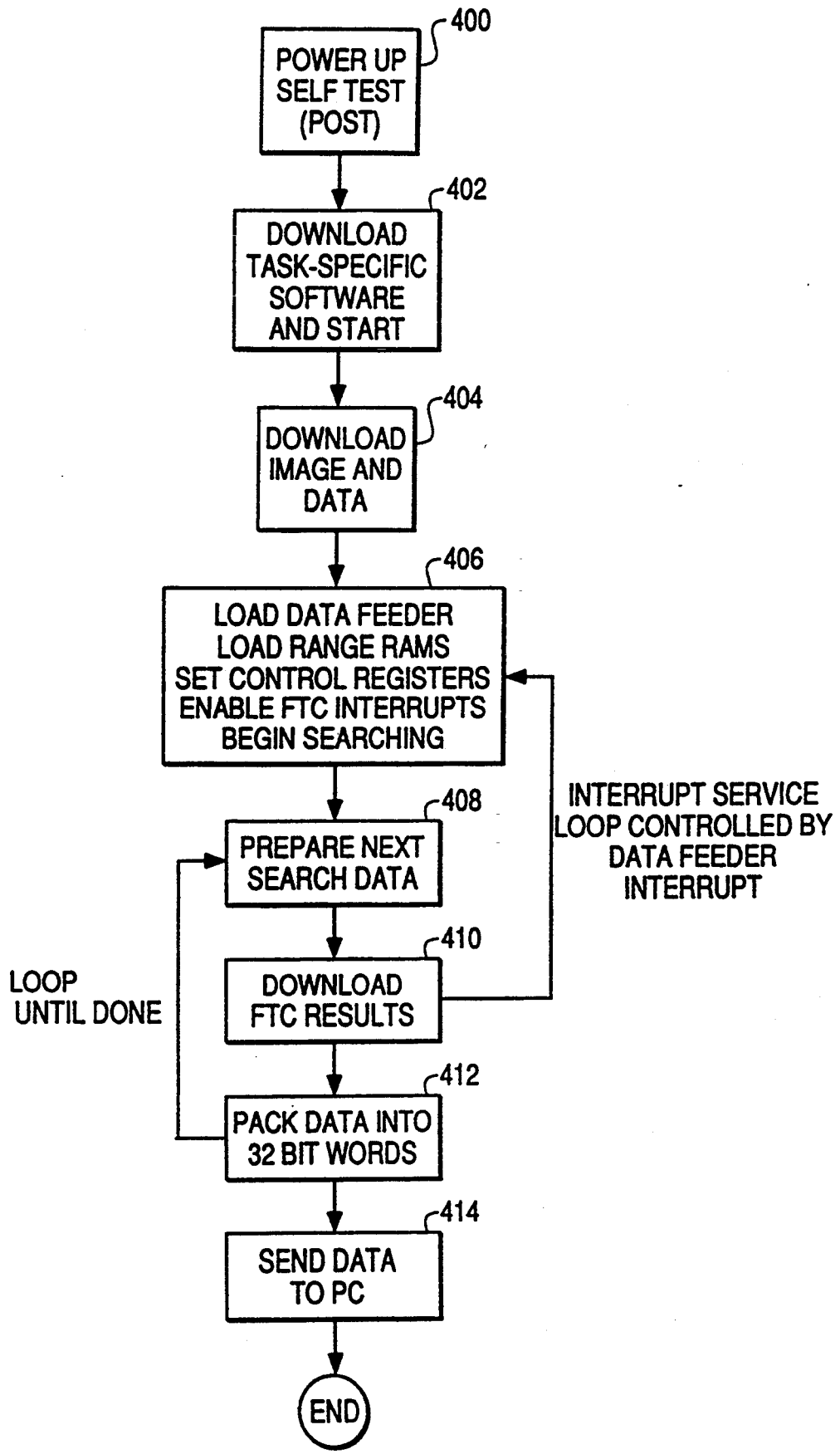
FIG. 13 is a logic flow diagram of software stored in an EPROM of the controller circuit shown in FIG. 5.

A description of firmware of EPROM 128 which controls operation of microcontroller circuit 122 will now be provided, with reference to FIG. 13.

Step 400—Power up self test and initialization. In this step, microcontroller circuit 122 performs a thorough test of all on-board memory, including memory in data feeder circuit 130 and in eight transform circuits 132. It tests each memory bit and each address bit, and finds out how much on-board memory is present and stores this information for future use.

Microcontroller circuit 122 runs tests to find out how many transform circuits 132 are present on the board 110 and responding correctly. This number is stored for future use.

Step 402—Downloading the software for the specific kind of compression task being required. Board 110 is capable of performing several compression tasks, e.g., compression of black and white, gray scale and color images of various sizes. For each task, the task specific-software is downloaded to the board from PC 112 under control of loading software of PC 112.

Step 404—Download image data to initialize the board for the compression task. Controller circuit 120 receives the image pixel data and other information, including the contractive parameter (p value), search parameters, and size(s) of the blocks to be compared, from PC 112, and puts them in scratchpad RAM 126. The details of p values are set forth in copending U.S. patent application Ser. No. 07/375,840. The data is processed by controller 120 to obtain necessary information and this too is put in scratchpad RAM 126. Such information may include for example, conversion of color parameters such as R G B→Y U V, performed by an encoder circuit (not shown) in controller 120. Alternatively, such processing may be performed in PC 112. Thus, for color pictures, the R G B digitized image data is converted in PC 112 to Y U V format and controller circuit 120 receives separate sets of Y,U, and V data for each image. The Y U V format is used in the encoding process since the image information contained in the g and V parameters can be compressed into a relatively small size file. The linear conversion formulae from R G B to Y U V and from Y U V to R G B are given below:

*RGB to YUV Conversion*

$$Y = \frac{77*R + 150*G + 29*B + 128}{256}$$

$$U = \frac{-38*R - 75*G + 113*B + 128*256 + 128}{256}$$

$$V = \frac{112*R - 94*G - 18*B + 128*256 + 128}{256}$$

*YUV to RGB Conversion*

$$R = Y + 1.6*(V - 128) = Y + 1.6*V - 1.6*128$$

$$B = Y + 2*(U - 128)$$

$$G = Y - \frac{6668 * 2*(V - 128) + 1589 * 4*(U - 128) + 8192}{16384}$$

Step 406—Load Data. Image data is divided into domain data (including orientation data) and range data, average values are calculated, and data is loaded into transform circuits 132 and data feeder circuit 130. Interrupts of circuits 132 are enabled and control signals are supplied to circuits 130 and 132 to begin calculations.

Step 408—Prepare next data. Before completion of calculations by transform circuits 132, controller circuit 120 prepares data for the next eight domain blocks to be sent.

Step 410—When calculations are completed for the eight domain blocks loaded into transform circuits 132, data feeder 130 generates an interrupt, which causes controller circuit 120 to read data from transform circuits 132. The least L2 distance for each domain block, the range block identifier, the orientation block identifier, the contraction parameter (p value), and the offset difference in shade (q value) are written to the scratchpad RAM.

Step 412, 414—Controller circuit 120 packs these five parameters from scratchpad memory of step 410 into a single thirty-two-bit word and sends it to the PC.

This completes operation by board 110. However, additional processing may be performed in PC 112. For example, steps 404–412 may be repeated if so needed, for example, for greater accuracy for different sizes of domain blocks.

Also, in case of color, the calculation is first performed for the Y part of the picture and then repeated for the U and V parts. PC 112 may perform optimization of data compression by repeating calculations of fractal transforms of an image using different domain block sizes.

All possible substitutions are sorted in PC 112 based on the ratio of the improvement of L2 distance to the consequent increase in file size. Domain block size choices are then taken from this sorted list to improve the overall L2 distance until the desired compressed file size is reached.

In the present invention, domain block preparation procedure involves loading transform circuits 132, while the range preparation procedure involves loading RAMs and control registers of data feeder circuit 130. The two procedures are independent, and new domain data can be loaded without affecting the range data, and new range data can be loaded for comparison with the same domain data.

The present invention provides improved methods and apparatus for optimizing the fractal transform data compression techniques described in the aforementioned copending patent application. In particular, the provision of multiple transform circuits and a data feeder circuit provides for parallel processing of multiple domain blocks, along with the capability to separately and independently load domain block data and range block data. Accordingly, high-speed image data compression is achieved.

The apparatus and methods described above comprise a preferred embodiment of the present invention. However, it will be apparent to those skilled in the art that various modifications and variations can be made in the apparatus and methods of this invention without departing from the spirit or scope of the present invention. For example, other controllers and host computer devices may be employed. Moreover, other types of shrinking, averaging, and image distance calculation techniques may be employed, and various block sizes and shapes may be employed. The present invention covers such modifications and variations which are within the scope of the appended claims and their equivalents.

What is claimed is:

1. Apparatus for generating signals representing an image in compressed digital form, comprising:

a memory for storing digital signals comprising digital image data representative of the image and for storing transformed data;

a control circuit coupled to the memory for receiving the digital image data, for subdividing the digital image data into a set of domain blocks and a set of range blocks each comprising pixel brightness data, for creating sets of multiple orientation blocks for the domain blocks each comprising pixel brightness data, for determining average brightness values for the domain and range blocks, for receiving transformed data corresponding to the domain blocks, for accumulating the transformed data in the memory, and for supplying the accumulated transformed data as output signals comprising a compressed digital representation of the image;

a data feeder circuit coupled to the control circuit for receiving the range block pixel brightness data and the range block average brightness values, and for creating intermediate range block values from the range block pixel brightness data and the range block average brightness values; and a plurality of fractal transform circuits coupled to the control circuit and the data feeder circuit, for individually receiving at least one set of orientation blocks and the intermediate range block values, for simultaneously determining for each domain block corresponding to the received set of orientation blocks a block pair including a selected orientation block and a selected range block which have the greatest similarity of all possible block pairs, for simultaneously generating transformed data for each domain block, the transformed data representing the selected orientation block and range block for each domain block, and for supplying the transformed data to the control circuit.

2. Apparatus as recited in claim 1, wherein the control circuit comprises means for creating orientation blocks which comprise blocks of pixel brightness data representative of the domain blocks after rotation and inversion.

3. Apparatus as recited in claim 2, wherein the control circuit comprises means for creating sets of orientation blocks which each comprise a set of eight pixel brightness data blocks, each set corresponding to a domain block, the eight orientation blocks consisting of blocks of pixel brightness data representative of the corresponding domain block rotated by 90°, 180°, 270°, and 360°, and the inversion of each rotated domain block.

4. Apparatus as recited in claim 3, wherein each fractal transform circuit comprises a circuit having four channels, each channel comprising means for processing a separate rotation orientation block and the inversion of the corresponding rotation orientation block.

5. Apparatus as recited in claim 2, wherein each fractal transform circuit comprises means for simultaneously generating transformed data for all orientation blocks corresponding to a domain block.

6. Apparatus as recited in claim 1, wherein each fractal transform circuit comprises means for determining for each domain block the selected orientation block and the selected range block which are separated by a least image distance.

7. Apparatus as recited in claim 6, wherein each fractal transform circuit comprises means for determining for each domain block the selected orientation block and the selected range block which are separated by a least L2 distance.

8. Apparatus as recited in claim 7 wherein each fractal transform circuit comprises means for calculating an L2 distance according to the following formula:

$$\min_j \left( \sum_i (\{z_i - [z + (pw_{ij} - pw_j)]_{truncate}\}^2/4) \right)$$

where
0<i<number of pixels per block
0<j<number of blocks in range
z=domain block pixel value
pw=range block pixel value 9. Apparatus as recited in claim 7, wherein each fractal transform circuit comprises an L2 register for storing a running lowest L2 value, and each fractal transform circuit comprises means for updating the L2 register if the L2 value calculated for the current range block is less than the value stored in the register.

10. Apparatus as recited in claim 1, wherein the data feeder circuit comprises means for creating an intermediate range block brightness value equal to the difference between the pixel brightness value of a selected range pixel and the average pixel brightness value for the range block containing the selected range pixel.

11. Apparatus as recited in claim 1, wherein the data feeder circuit comprises a range pattern memory circuit.

12. Apparatus as recited in claim 1, wherein the data feeder circuit comprises a range pixel memory circuit.

13. Apparatus as recited in claim 1, wherein the data feeder circuit comprises a range average memory circuit.

14. Apparatus as recited in claim 1, wherein the data feeder circuit comprises a range address controller circuit.

15. Apparatus as recited in claim 1, wherein the data feeder circuit comprises a range subtraction circuit for creating an intermediate range value equal to the difference between a selected range block pixel brightness value and a range block average pixel brightness value for the range block containing the selected range pixel.

16. Apparatus as recited in claim 1, wherein the control circuit comprises means for storing a list of domain blocks and range blocks which have been sent to the plurality of fractal transform circuit and data feeder Circuit, respectively.

17. Apparatus as recited in claim 1, wherein the control circuit comprises means for generating a set of domain blocks and a set of range blocks each comprising pixel brightness data processed by contraction parameter values and shade offset difference values.

18. Apparatus as recited in claim 1, comprising means for removably connecting said apparatus to an associated host computer.

19. Apparatus for generating signals representing an image in compressed digital form, comprising:
a memory for storing digital signals comprising digital image data representative of the image and for storing transformed data;
a control circuit coupled to the memory for processing the digital image data into domain block data and range block data, the domain block data comprising a set of domain blocks and the range block data comprising a set of range blocks, the set of domain blocks comprising a set of non-overlapping uniquely addressable blocks of pixel brightness data which collectively contain all of the digital image data, and the set of range blocks comprising a set of uniquely addressable blocks of pixel brightness data of the digital image data which have been subjected to a contractive process; for accumulating transformed data in the memory; and for supplying the accumulated transformed data as output signals comprising a compressed digital representation of the image;
a data feeder circuit coupled to the control circuit for receiving the range block data, and for creating intermediate range block values from the range block data; and
a plurality of fractal transform circuits coupled to the control circuit and the data feeder circuit for receiving domain block data for a plurality of domain blocks and the intermediate range block values; for simultaneously determining, for each domain block corresponding to the received domain block data, a selected range block which has the greatest similarity; for generating transformed data, for each domain block corresponding to the received domain block data, which is representative of the selected range block; and for supplying the transformed data to the control circuit.

20. Apparatus for generating signals representing an image in compressed digital form, comprising:
a memory for storing digital image data representative of the image and transformed data;
a control circuit coupled to the memory for receiving the digital image data, for dividing the digital image data into a first group of subsets and a second group of subsets, each of the subsets comprising pixel brightness data, for accumulating transformed data in the memory, and for supplying the accumulated transformed data as output signals comprising a compressed digital representation of the image; the control circuit comprising means for receiving digital image data comprising a set of pixel brightness values, and means for generating a set of range pixel brightness values each formed as the average of a plurality of pixel brightness values of the digital image data, for generating a plurality of subdivision values specifying the order in which the range pixel brightness values are to be arranged into the second group of subsets, and for supplying the range pixel brightness values and the subdivision values to the data feeder circuit;

a data feeder circuit coupled to the control circuit for receiving the second group of subsets and for generating data representative of the second group of subsets, the data feeder circuit comprising a first memory circuit for storing the range pixel brightness values, a plurality of storage locations for storing the subdivision values, and a feeder control circuit for supplying intermediate values representative of brightness values of range pixels arranged in the order specified by the subdivision values; and a plurality of fractal transform circuits coupled to the control circuit and the data feeder circuit, for receiving the first group of subsets and the representative data, for determining for each of the first group of subsets a selected one of the second group of subsets which has the greatest similarity, for generating transformed data for each of the first group of subsets which is representative of the selected one of the second group of subsets, and for supplying the transformed data to the control circuit.

* * * * *